(No Model.)
A. B. KILBOURNE
PLUMB BOB.
No. 592,913. Patented Nov. 2, 1897.
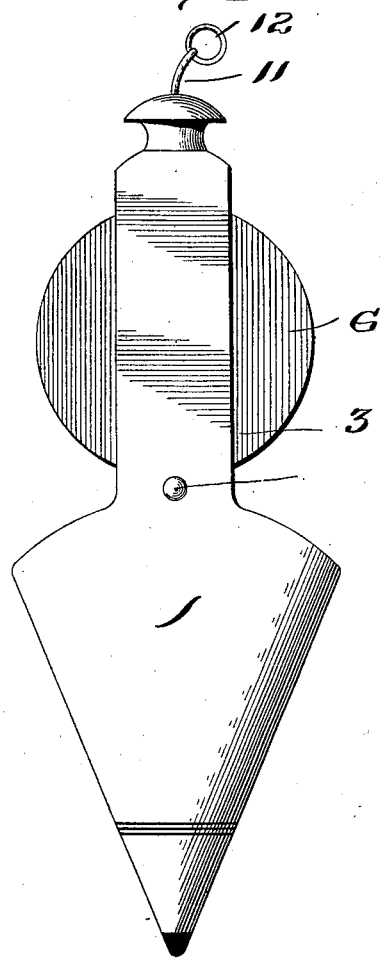
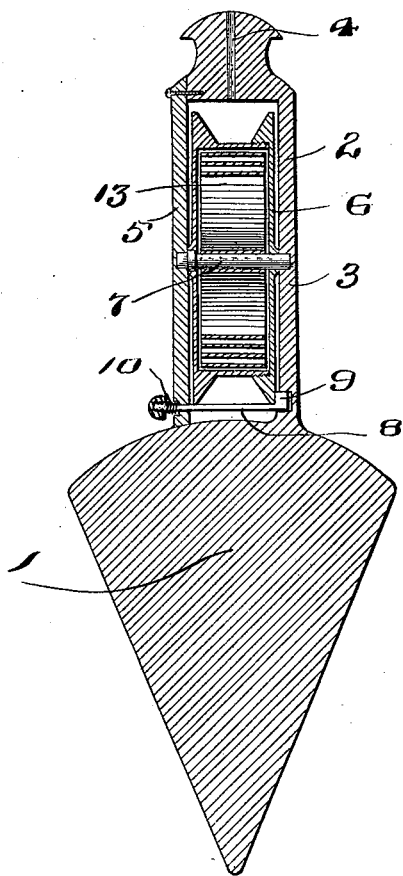
WITNESSES
INVENTOR
Albert B. Kilbourne,
by John Wedderburn
Attorney

UNITED STATES PATENT OFFICE.

ALBERT B. KILBOURNE, OF WEST PIKE, PENNSYLVANIA.

PLUMB-BOB.

SPECIFICATION forming part of Letters Patent No. 592,913, dated November 2, 1897.

Application filed October 9, 1896. Serial No. 608,372. (No model.)

*To all whom it may concern:*

Be it known that I, ALBERT B. KILBOURNE, a citizen of the United States, residing at West Pike, in the county of Potter and State of Pennsylvania, have invented certain new and useful Improvements in Plumb-Bobs; and I do hereby declare the following to be a full, clear, and exact description of the invention, such as will enable others skilled in the art to which it appertains to make and use the same.

This invention relates to a novel construction in a plumb-bob; and it consists in the features of construction hereinafter described and claimed.

In the accompanying drawings, illustrating this invention, Figure 1 is an end elevation, and Fig. 2 is a vertical section.

In said drawings, 1 indicates the weight, and 2 the shank. The said shank consists of two parallel plates, one of which, 3, is made integral with the weight 1 and has at its outer end a cord-aperture 4. The other plate, 5, fits upon this plate and is suitably secured thereto, while it leaves a space for the drum or barrel 6. Extending between plates 3 and 5 is a shaft 7, rigidly secured to said plates to prevent rotation, and the drum or barrel 6 is mounted upon this shaft. The said barrel is hollow and is provided with a spring 13, the ends of which are connected with the drum and with the shaft 7. At the lower end of the plates is a brake 8, having a head 9, adapted to come into contact with the side of the drum, while the shank of this brake extends out through the plate 5 and is provided with a knob, a spring 10 being located between the knob and plate to hold the head of the brake against the side of the drum. A cord 11 passes through the aperture 4 and is connected with the drum 6, said cord having a ring 12 to prevent its being drawn through the opening 4.

The apparatus is used in the following manner: When it is desired to use the bob, the cord is pulled out to the desired length, thereby winding up the spring. The brake will hold the drum against rotation to prevent the cord being withdrawn. It will also be understood that the cord can be unwound from the drum by suddenly dropping the bob or by successive or quick jerks. When it is desired to wind up the cord, by pressing upon the brake 8 the drum is released and the spring will wind in the cord.

Having thus described my invention, what I claim as new, and desire to secure by Letters Patent, is—

A plumb-bob consisting of a weight having parallel plates upon its upper end provided at their upper ends with a cord-aperture, a spring-actuated drum mounted between said plates, and a brake for said drum consisting of a transverse shank mounted between said plates; having a head situated adjacent one side of said drum, and a spring for holding said head against said drum.

In testimony whereof I have signed this specification in the presence of two subscribing witnesses.

ALBERT B. KILBOURNE.

Witnesses:
 NELSON L. ALLEN,
 C. E. MILLER.